(12) United States Patent
Mac Farland

(10) Patent No.: US 6,199,936 B1
(45) Date of Patent: Mar. 13, 2001

(54) MOTOR VEHICLE FOLDING TOP SYSTEM

(75) Inventor: David Mac Farland, UnterschleiBheim (DE)

(73) Assignee: Dura Convertible Systems GmbH, Cologne (DE)

( * ) Notice: Subject to any disclaimer, the term of this patent is extended or adjusted under 35 U.S.C. 154(b) by 0 days.

(21) Appl. No.: 09/356,199

(22) Filed: Jul. 16, 1999

(30) Foreign Application Priority Data

Jul. 20, 1998 (DE) .............................................. 981 13 503

(51) Int. Cl.[7] ...................................................... B60J 7/12
(52) U.S. Cl. ................ 296/116; 296/107.08; 296/107.12
(58) Field of Search ........................ 296/107.01, 107.08, 296/107.12, 107.09, 116, 136, 124

(56) References Cited

U.S. PATENT DOCUMENTS

| 2,076,243 | * | 4/1937 | Marshall et al. ................ 296/107.09 |
| 2,157,783 | * | 1/1939 | Bessonneau ........................ 296/116 |
| 2,479,599 | * | 8/1949 | Bessonneau ........................ 296/116 |
| 3,047,332 | * | 7/1962 | Carpenter ........................... 296/116 |
| 3,328,072 | * | 6/1967 | Adamski ............................ 296/116 |
| 5,004,291 | * | 4/1991 | Bauer et al. ....................... 296/116 |
| 5,267,769 | * | 12/1993 | Bonne et al. ................... 296/107.08 |
| 5,338,085 | * | 8/1994 | Guckel et al. .................... 296/116 X |
| 5,620,226 | * | 4/1997 | Sautter, Jr. ..................... 296/107.08 |
| 5,649,733 | * | 7/1997 | Seel et al. ........................ 296/37.5 |
| 5,749,619 | * | 5/1998 | Mentink .......................... 296/107.09 |
| 5,769,483 | * | 6/1998 | Danzl et al. .................... 296/107.08 |

FOREIGN PATENT DOCUMENTS

| 601 041 | | 8/1934 | (DE) . |
| 0733505 | | 9/1996 | (EP) ................................ B60J/7/12 |
| 361215120 | * | 9/1986 | (JP) . |

* cited by examiner

Primary Examiner—D. Glenn Dayoan
Assistant Examiner—Patricia Engle
(74) Attorney, Agent, or Firm—Gardner, Carton & Douglas

(57) ABSTRACT

The present invention relates to a motor vehicle folding top system with a foldable folding top (13) in which a rear window (43) is positioned, a rod which has articulated- or support rods (18, 19) supported in an articulated manner, several transverse support units (33) which extend in the transverse direction of the motor vehicle and serve for the tightening of the folding top (13), a folding top casing (5) in which the folded folding top (13) can be accommodated, and a folding top flap (7) which at least partially covers over the folding top casing (5). In accordance with the invention, the motor vehicle folding top system has a swivelling supporting device (23) for the rod in the area of the folding top casing (5), which can be swivelled from an upright locking position into a folded starting position of the folding top, in the direction of the rear of the motor vehicle.

11 Claims, 3 Drawing Sheets

MOTOR VEHICLE FOLDING TOP SYSTEM

DESCRIPTION

The present invention relates to a motor vehicle folding top system, particularly for convertibles, in accordance with the introductory portion of claim 1.

BACKGROUND OF THE INVENTION

Open motor vehicles, in the form of convertibles, speedsters, etc., are enjoying increasing popularity. In this connection, the motor vehicles are increasingly being used not only as pure "fair weather" vehicles during the warm seasons, but must also be suitable for all conditions of weather, in order to be able to exist as an acceptable alternative in relation to conventional sedans vehicles or coupes.

This means, on the one hand, that stable folding top systems which are resistant to all conditions of weather, particularly snow and ice during the winter, and which can be quickly and easily opened and subsequently closed again at any time, such as during any warm solar irradiation, during any season of the year, are necessary.

Because of the requirement for the everyday use of such types of motor vehicles, increased demands are additionally being placed on the possibility of the useful load in order to also be able to accommodate larger quantities of baggage and purchases for the home and household.

A conventional motor vehicle folding top system has a foldable folding top in which a rear window is positioned, whereby the durable folding top is attached to an articulation element which has support rods which are supported in an articulated manner, and which are connected with several transverse support units extending in the transverse direction of the motor vehicle and serving for the tightening of the folding top, whereby a folding top casing, in which the opened and folded folding top can be accommodated, is provided. A folding top flap which incompletely covers the folding top casing, both in the opened as well as in the closed position of the folding top, is provided for the at least partial covering of the folding top.

If a folding flap is provided, it is disadvantageous in the motor vehicle folding top systems in accordance with the state of the art that, if they have a folding top flap, the folded folding top is displaced far into the trunk area and is folded together in a correspondingly small manner which, on the one hand, considerably restricts the volume of the trunk and, on the other hand, renders the possibility of a rigid glass rear window, with the supplemental elements such as rear window heating, antenna wires, etc., positioned correspondingly within it, which is conventional with closed motor vehicles, impossible.

Still more unfavorable motor vehicle folding top systems, even in some very high-value vehicles, do not afford any complete lowering of the motor vehicle folding top, and the foldable folding top is, in the folded condition, not completely stowed away and still projects out from the vehicle. Strong aesthetic disadvantages are then also associated with these aerodynamic disadvantages.

SUMMARY OF THE INVENTION

The object underlining the present invention is therefore that of improving a motor vehicle folding top system of the type described above in such a manner that the foldable top flap can be completely covered and can, by means of a rear folding top flap, be positioned in the motor vehicle in the opened condition of the folding top and that, at the same time, a maximum measure of available storage space is created in the vehicle, particularly in the volume of trunk.

This object is achieved by means of the features of claim 1.

Through the fact that a swivelable supporting device of the rod, which can be swivelled into an opening position of the folded folding top in the direction of the rear of the motor vehicle, is provided in the area of the folding top casing, it is brought about that the entire rod of the folding top, with the folding top attached to the same, can be swivelled considerably more deeply into the motor vehicle, whereby the rear window area can, at the same time, be further lowered downwardly without being swivelled far into the rear in the direction of the trunk, through which the possibility is created that even rigid rear windows, particularly of glass, can be accommodated in the motor vehicle folding top.

The significant disadvantages of the state of the art are thereby overcome and, in addition to the enlarged storage space, an additional configuration of the opened vehicle, which is considerably more attractive in aesthetic terms, is thereby also achieved.

The supporting device advantageously has a bearing plate, preferably acutely angled, which is constructed in a triangle shape. A simple and stable supporting of the rod on the motor vehicle is thereby created.

The lower area of the bearing plate is thereby advantageously connected with the motor vehicle in an articulated manner, so that the bearing plate, for its part, and thereby the supporting device as well, can be swivelled around this articulation axis.

In addition, the rod advantageously has two lateral sections, each of which preferably has four rods or articulation support rods. The lateral sections are, for the purpose of stretching out the folding top, located on the specific external longitudinal side of the motor vehicle, and the articulation support rods serve for the folding of the lateral section of the rod.

Two articulated support rods are, in an advantageous manner, each connected with one another in pairs in an articulated manner, and the two parts of one side are connected with one another in an articulated manner, as the result of which a well-guided, foldable construction of the rod is brought about. By means of the configuration which has been described above, a good forceful guiding of the articulated support rods under one another, up to the flawless and stable folding down and folding up of the folding top, is also brought about.

It is advantageous, in addition, that the lower sections of one articulated support rod of each pair of articulated support rods are connected with the support device in an articulated manner. This creates, in an advantageous manner, the possibility of displacing the lower rod engagement point to the rear, and makes a still smaller folding together of the folding top along with the rod possible.

The motor vehicle folding top system in accordance with the invention has, advantageously, a material tightening bracket which is positioned in a rotatable manner on both lateral supporting devices and is connected with the lower edge of the folding top. By that means, a correct tightening of the folding top is made possible in a very simple manner.

A device for the adjustment of the tightening of the material advantageously engages with the material tightening bracket. This makes the subsequent tightening of the material of the folding top possible in a particularly advantageous manner, since the material does, because of its own elasticity, even if limited, give way to a certain extent, particularly through the influences of the weather, so that a subsequent tightening to the correct fitting of the folding top is necessary. This advantage also extends to the mounting of such a type of folding top since, because of unavoidable manufacturing tolerances, a subsequent adjustment is, as a general rule, necessary for the precisely correct seat of the folding top. The correct adjustment can therefore take place even upon the mounting in the simplest manner which, in turn, lowers the production times and thereby the production costs.

In one preferred form of implementation, the material tightening device has two adjusting pinions which are supported on the motor vehicle, on both sides of the motor vehicle, within the area of the folding top casing. By that means, the material tightening bracket is correspondingly moved through the activation of the adjusting pinion, and the correct tightening of the folding top is brought about.

In an alternative manner, an adjusting pinion can be provided in the middle of the motor vehicle, or not far from the same.

In one additional great advantage, the motor vehicle system in accordance with the invention has a swivelable base plate, the swivelling axis of which is positioned in the rear, top end area of the folding top casing. By that means, the possibility is created of reducing the volume of the folding top casing with the folding top closed, and thus if the folding top is not inside the folding top casing, and, by that means, of considerably enlarging the storage space, particularly the trunk volume of the motor vehicle.

Further details, characteristics, and advantages of the invention proceed from the following description, with reference to the diagrams. These depict the following:

DESCRIPTION OF THE DRAWINGS

FIG. 1: A lateral view of a motor vehicle constructed as a convertible with a motor vehicle folding top system in accordance with the invention, in the folded-in condition and with the windshield placed on;

DETAILED DESCRIPTION OF THE DRAWINGS

A motor vehicle folding top system (1) in accordance with the invention will now be described in detailed form in the following by means of FIGS. 1 to 6. The mechanism will thereby be described in stages, from the folding top completely opened and the folding top system folded in, up to the closed condition of the motor vehicle folding top.

Figure 1:
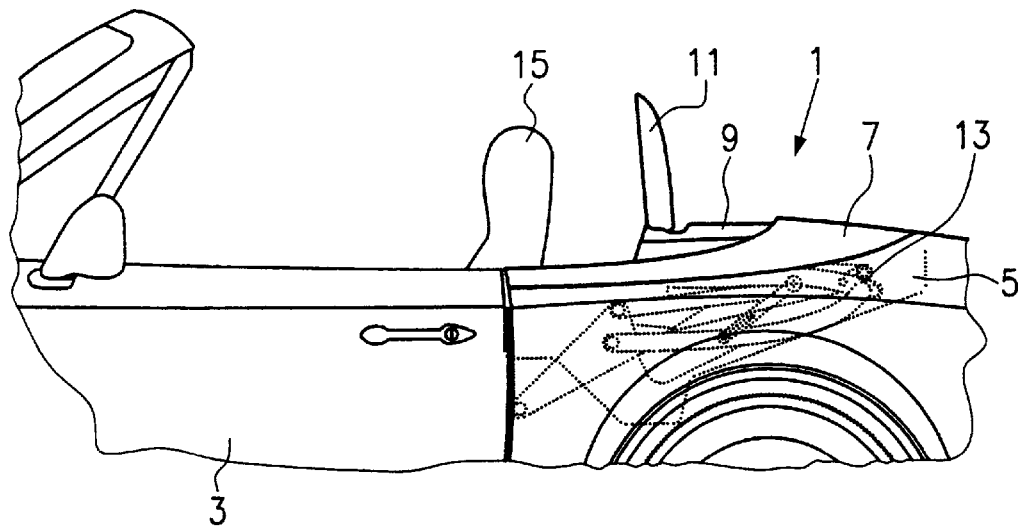

A motor vehicle folding top system (1) in a convertible (3) in accordance with the invention is depicted in FIG. 1. The folding top (13), with rod (17) and supporting device (23), is accommodated, in the folded-in condition, within a folding top casing (5). The details of the rod and of the supporting device will be described at a later point.

The folding top casing (5) is closed by a folding top flap (7) which extends, in a curved manner, from the rear wing, over the folding top casing, symmetrically to the other side, and up to the door of the motor vehicle again.

There is provided an additional folding top flap (9) which has, on its upper side, a swivelable windshield (11) which, in the depicted example of FIG. 1, is set up in the windshield function.

As is additionally evident, the folding top casing (5) extends from the upper area of the trunk diagonally over the rear axis, in a forward direction, and forms the mounting unit space of the folded-in folding top (13).

Figure 2:
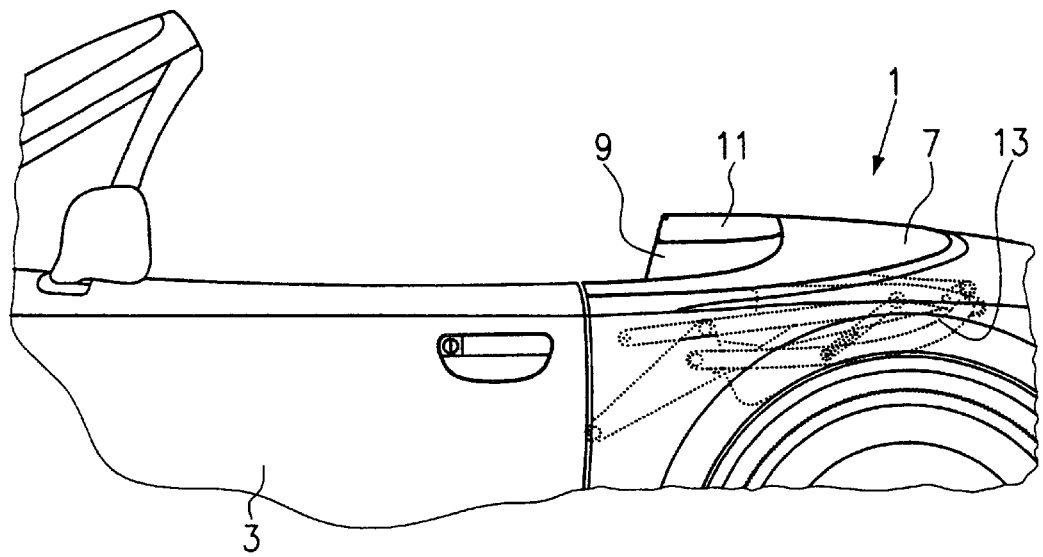
FIG. 2: The view of FIG. 1 with the windshield retracted.

In FIG. 2, the windshield (11) is folded to the rear, so that the folding top casing is essentially closed close behind the forward seat of the motor vehicle (3).

The supplemental folding top flap (9) is movable and can, in particular, be positioned to be swivelled to the front, and can, in particular, be swivelled in behind the seat (15) of the vehicle.

Figure 3:
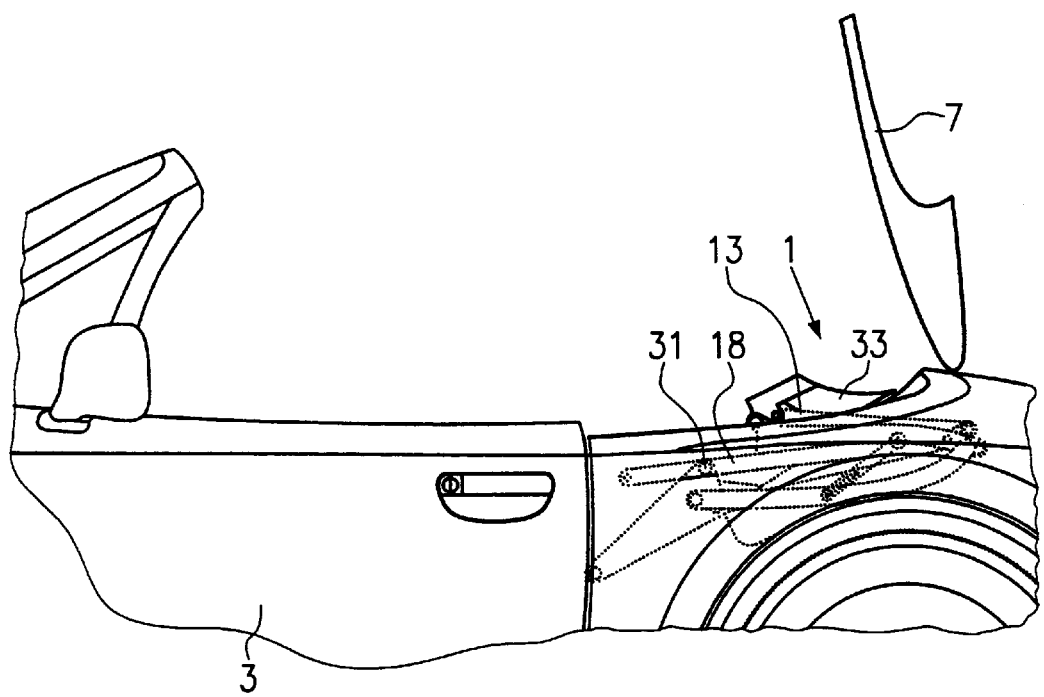
FIG. 3: An analogous view to FIG. 2, with the folding top flap raised.

In FIG. 3, the supplemental folding top flap (9) has, together with the windshield (11), been swivelled and lowered, and the folding top flap (7) has been opened. The folding top (13) has, in addition, been placed in the folded-in, collapsed position.

Figure 4:
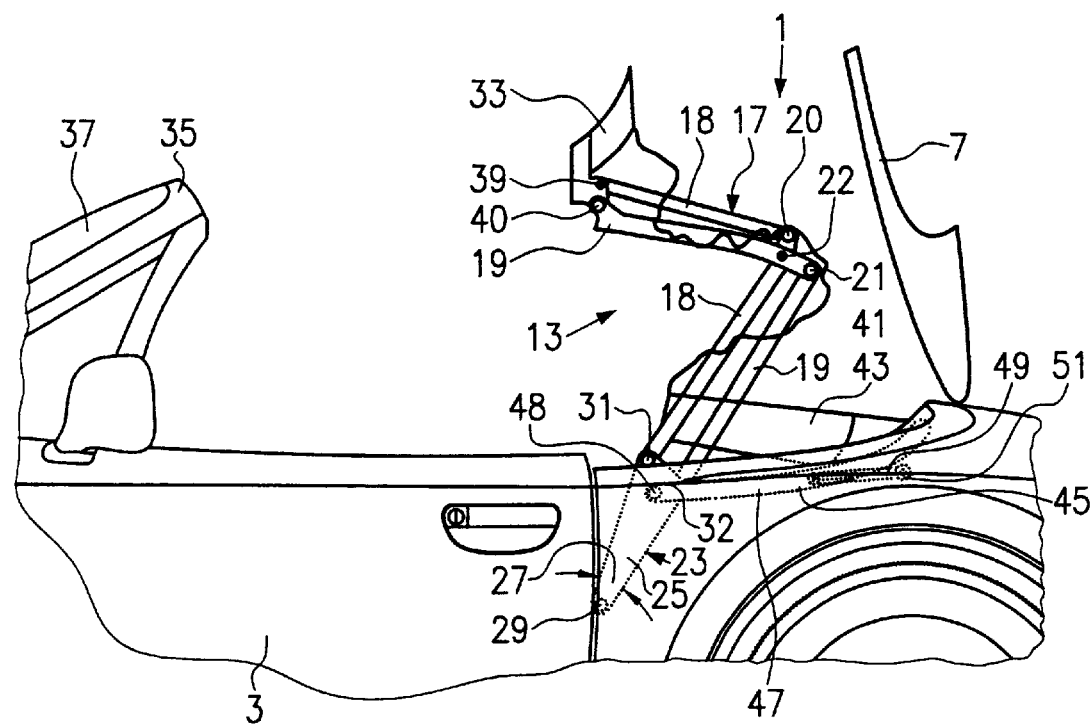
FIG. 4: A similar view to that of FIG. 3, but with the rod partially folded down

A position of the folding top (13) in a position half folded-down is depicted in FIG. 4. The construction of the motor vehicle folding top system (1) in accordance with the invention will now be described by means of this figure.

The folding top (13) has a rod (17) which has two pairs of articulated- or support rods (18 and 19) on each longitudinal side of the convertible.

Each pair of support rods (18 and 19) is connected with one another in an articulated manner at (20 or 21) and, in addition, the pair of support rods (18) is connected in an articulated manner, at (22), with the pair of support rods (19).

Each pair of support rods (18 and 19) is connected in an articulated manner with a supporting device (23) in the lower area. The supporting device (23) is constructed, in the example of implementation depicted, in the form of a plate-shaped body or of a bearing plate (25) which is constructed in an acutely-angled and triangular shape. The acute angle (27) of the bearing plate (25) is located at the lower end of the bearing plate (25), and this is connected in an articulated manner, at (29), to the chassis of the motor vehicle.

Both of the lower support rods (18 and 19) are likewise connected with the bearing plate (25) by way of articulation connections (31 and 32).

A forward transverse support unit, which serves for the forward securing of position of the folding top (13) to the upper edge area (35) of the windshield (37) of the motor vehicle, are connected, in an articulated manner, to the forward end of both pairs of support rods (18 and 19).

By means of the articulated positioning by means of the articulation connections (39 and 40), the transverse support unit (33) is, through the movement of the support rods (18 and 19), swivelled in a corresponding manner, as is evident from the comparison of FIGS. 3 and 4.

The line of a folding top plane (41) or of a folding top material is only depicted schematically. The folding top plane (41) proceeds from the forward transverse support unit (33), by way of additional transverse support units (not depicted), up to a rear window (43) and, further, up to a tightening device (45).

The rear window (43) is preferably a rigid pane of glass, which is possible here because of the space-saving accommodation of the folding top. This has, in turn, the advantage that the devices that are usually placed in normal vehicles, such as heating wires, antenna wires, etc., can likewise be present.

The material tightening device (45) has a tightening bracket (47) which is supported, in an articulated manner, on the lateral supporting devices (23) at the point (48). An adjusting pinion (49), preferably on each side of the motor vehicle, is connected in an articulated manner with the material tightening bracket (47), on the hand, and connected in an articulated manner with the chassis of the vehicle at point (51), as well as with the chassis of the vehicle itself. Through the activation of the adjusting pinion (49), the material tightening bracket (47) can be changed in its position, as the result of which a material tightening can be carried out, both upon the mounting as well as later, for reason of the fatiguing of the material.

Figure 5:
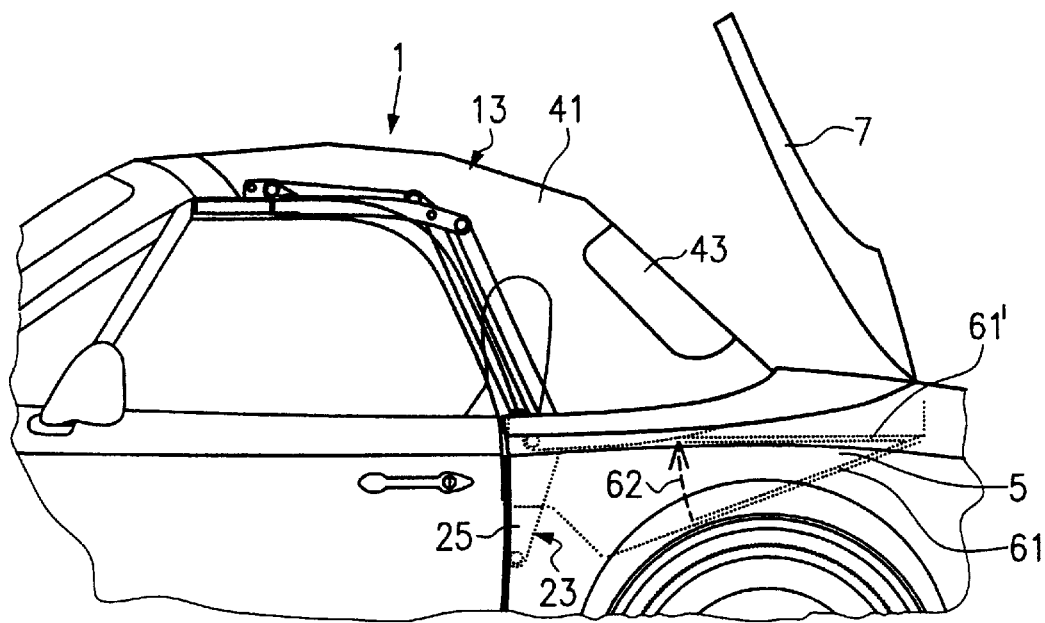
FIG. 5: A lateral view of a convertible with the folding top snapped shut and the top folding flap still opened.

The motor vehicle with its folding top (13) closed is depicted in FIG. 5, whereby the folding top flap (7) is still positioned in the opened position. The supporting device (23) is, along with the bearing plate (25), swivelled into its most forward position, in which it simultaneously stands upright.

The folding top casing (5) has a base plate (61) which can be swivelled from its lower position into an upper position (61') in accordance with the dotted arrow (62). A considerably enlarged storage space in the motor vehicle, which can be loaded from the trunk side, in particular, evidently results from that.

Figure 6:
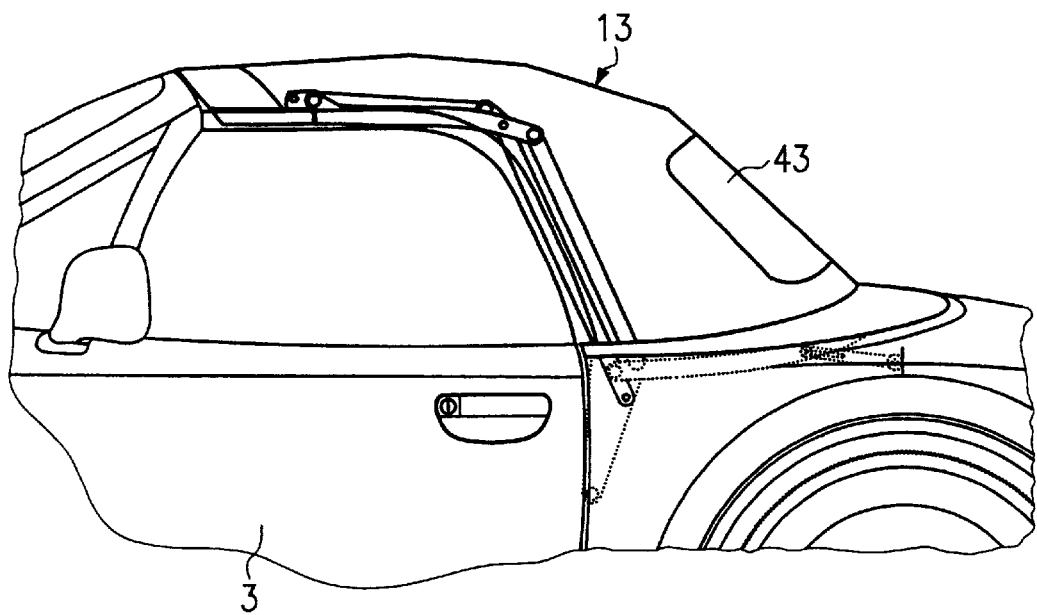
FIG. 6: An analogous view to FIG. 5, but with the motor vehicle folding top and the folding top flap completely closed.

The convertible is depicted in FIG. 6, finally, in the completely closed position of the folding top (13).

As is evident, in particular, in the overall view of FIGS. 3 to 5, a considerably more compact construction is created through the swivelling of the supporting device (23) to the rear or from the rear again. Upon the swivelling from the position in accordance with FIG. 5 into the position in accordance with FIG. 3, the rod (18) moves along the articulation point, that is to say, the articulation connection (31) moves onto or into the support rod (18). This leads to an additionally compact construction and, in particular, to a shifting of the previously usual folding top system into the direction of the driver's seat, as the result of which a considerably more compact folded position is brought about.

The more compact folded position is achieved both in the lesser projection to the rear, as well as in a deeper folding into the folding top casing, as the result of which the folding top flap (7) can be swivelled. Consequently, many advantages are realized at one time in the new motor vehicle folding top system, as has been discussed above. The motor vehicle folding top system (1) thereby has an extremely stable configuration, which also satisfies the requirements of the motor vehicle at high speeds.

What is claimed is:

1. A motor vehicle folding top system comprising:
   a foldable folding top, in which a rear window is positioned;
   a rod, which has support rods supported in an articulated manner;
   several transverse support units, which extend in the transverse direction with respect to the support rods; and
   a folding top casing, wherein the folded folding top can be accommodated;
   characterized in that:
   a swiveling supporting device of the rod, which is formed as a bearing plate and which is adapted to be swiveled from the upright closed position of a folding top into a folded opening position of the folding top in the direction of the rear of a motor vehicle, is provided in the area of the folding top casing.

2. The motor vehicle folding top system in accordance with claim 1 wherein the bearing plate is acutely angled and is constructed in a triangular shape.

3. The motor vehicle folding top system in accordance with claim 2, wherein the lower area of the bearing plate is adapted to be connected with the motor vehicle in an articulated manner.

4. The motor vehicle folding top system in accordance with claim 1 wherein the rod has two lateral sections, each one of which has articulated support rods.

5. The motor vehicle folding top system in accordance with claim 4, wherein the four articulated support rods form two pairs of articulated support rods and wherein the articulated support rods in each pair are connected with one another in an articulated manner.

6. The motor vehicle folding top system in accordance with claim 5, wherein, both of the pairs of one side are connected with one another in an articulated manner.

7. The motor vehicle folding top system in accordance with claim 4, wherein the lower sections of the articulated support rods are connected with the bearing plate.

8. The motor vehicle folding top system in accordance with claim 1, further comprising a material tightening device, preferably with a material tightening bracket, which is positioned in a rotatable manner on the supporting device and is connected with the folding top.

9. The device in accordance with claim 8, wherein an adjustment device for the adjustment device of the tension of the material engages with the material tightening bracket.

10. The motor vehicle folding top in accordance with claim 9, wherein the adjustment has two adjusting pinions which are adapted to be supported one on either side of the motor vehicle, in the area of the folding top casing.

11. The motor vehicle folding top system in accordance with claim 1, wherein the folding top casing has a swivelable base plate, the swiveling axis of which is positioned in an upper, rear area of the folding top casing.

* * * * *